(12) United States Patent
Colle et al.

(10) Patent No.: US 7,861,150 B2
(45) Date of Patent: Dec. 28, 2010

(54) TIMING ASPECTS OF MEDIA CONTENT RENDERING

(75) Inventors: Oliver Colle, Redmond, WA (US);
James C. Finger, Kirkland, WA (US);
Cathleen M. Guinan, Seattle, WA (US);
John Andre Yovin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 11/594,352

(22) Filed: Nov. 7, 2006

(65) Prior Publication Data

US 2008/0109727 A1      May 8, 2008

(51) Int. Cl.
     *G06F 17/00*  (2006.01)
(52) U.S. Cl. ...................... 715/203; 715/719
(58) Field of Classification Search ........... 715/205, 715/719, 723
     See application file for complete search history.

(56) References Cited

U.S. PATENT DOCUMENTS

| | | | |
|---|---|---|---|
| 5,109,482 A | | 4/1992 | Bohrman |
| 5,412,773 A | | 5/1995 | Carlucci et al. |
| 2001/0025297 A1 | | 9/2001 | Kim et al. |
| 2002/0118220 A1* | | 8/2002 | Lui et al. .................... 345/709 |
| 2003/0196165 A1 | | 10/2003 | Jung et al. |
| 2004/0001106 A1 | | 1/2004 | Deutscher et al. |
| 2004/0114050 A1 | | 6/2004 | Besen et al. |
| 2004/0223740 A1* | | 11/2004 | Itoi .............................. 386/95 |
| 2005/0047754 A1 | | 3/2005 | Jung et al. |
| 2006/0062295 A1 | | 3/2006 | Lin et al. |
| 2006/0104608 A1 | | 5/2006 | Llach et al. |
| 2006/0165384 A1 | | 7/2006 | Park |
| 2006/0235866 A1 | | 10/2006 | Park |

OTHER PUBLICATIONS

Apple, Final Cut Pro 5 User Manual, May 11, 2005, Apple.*
"HD DVD Player", Date: 2003, http://www.toshiba.com/tai-new/Commercial.html.
"Image is everything", http://www.toshiba-experience.ro/catalog/2007.pdf.
Imoji, et al., "4.3-4 HD DVD Video Player", Date: Jan. 2006, pp. 169-170, http://ieeexplore.ieee.org/iel5/10651/33618/01598364.pdf?isnumber=&arnumber=1598364&htrv=44.

* cited by examiner

*Primary Examiner*—Doug Hutton
*Assistant Examiner*—Nathan Hillery
(74) *Attorney, Agent, or Firm*—Mayer & Williams PC

(57) ABSTRACT

Timing for execution of certain user inputs and application instructions occurring during play of an interactive multimedia presentation is discussed. A current state is defined by a state of the presentation system at the time a current media sample is being played to a user. A predicted state is defined by a state of the presentation system one or more future play times. Examples of current and predicted states include media retrieval states and media presentation states. An instruction or user input that is based on the current state is identified, and the predicted state is used to determine an effect of the instruction or input. The effect may then be executed at a predetermined time, such as after the next playable media sample is played to the user.

13 Claims, 9 Drawing Sheets

TIMING ASPECTS OF MEDIA CONTENT RENDERING

BACKGROUND

Multimedia players are devices that render combinations of video, audio or data content ("multimedia presentations") for consumption by users. Multimedia players such as DVD players currently do not provide for much, if any, user interactivity during play of media content—media content play is generally interrupted to receive user inputs other than play speed adjustments. For example, a user of a DVD player must generally stop the movie he is playing to return to a menu to see the various options allowing him to select and receive features such as audio commentary or effects, actor biographies, or games.

Interactive multimedia players are devices (such devices may include hardware, software, firmware, or any combination thereof) that render combinations of interactive content concurrently with traditional video, audio or data content ("interactive multimedia presentations"). Interactive content is generally any user-selectable visible or audible object presentable alone or concurrently with other video, audio or data content. Although any type of device may be an interactive multimedia player, devices such as optical media players (for example, DVD players), computers, and other electronic devices are particularly well positioned to enable the creation of, and consumer demand for, commercially valuable interactive multimedia presentations because they provide access to large amounts of relatively inexpensive, portable data storage.

To enhance investment in all types of media content players, particularly interactive multimedia players and interactive multimedia presentations, it is desirable to provide predictable and relatively glitch-free play of video, audio or data content, and to ensure the accurate synchronization of interactive content with the video, audio, or data content.

SUMMARY

An interactive multimedia presentation has a play duration, and includes a media content component and an interactive content component. One example of media content is a movie, but media content may be video, audio, data, or any combination thereof. Media content is arranged into a number of samples. Sets of such samples are referred to as clips, with one clip generally receivable from one media source. Interactive content is in the form of one or more applications, which provide instructions for organizing, formatting, and synchronizing the presentation of interactive objects to a user, often concurrently with media content. An application usually includes instructions both in declarative form (for example, extensible markup language form) and in script form, but may include only instructions in declarative form or only instructions in script form.

Sometimes, execution of user input (such as a play speed adjustment or selection of interactive content) or application instructions affects what content is next played to a user. Often, such user input or application instructions arise at times when media content and interactive content are being pre-rendered, when immediate execution of their effects could cause glitches in the play of the media content and/or loss of synchronization between the media content and the interactive content.

Methods, systems, apparatuses, and articles of manufacture for playing interactive multimedia presentations that are discussed herein involve identifying instructions or user inputs that are executable based on certain predefined states, and timing the execution of such instructions or user inputs in a manner that minimizes glitches and/or loss of synchronization. More specifically, certain actions taken during play of an interactive multimedia presentation include using a media timeline to identify a current elapsed play time within a play duration of an interactive multimedia presentation. The current elapsed play time represents a time when a current media sample from a current media source is being played to a user. Current and predicted states are ascertained—the current state is associated with an aspect of the presentation system at the current elapsed play time (for example, a state of the current media sample or the current media source); the predicted state is associated with an aspect of the presentation system at one or more future times (future play times may be any times in the future, including but not limited to future play times at which one or more future media samples are playable, or intervals thereof). An instruction or user input that is executable based on the current state is identified, and instead of executing the instruction or user input based on the current state, the instruction or user input is executed based on the predicted state.

One or more state values (referred to as "media state values" for exemplary purposes), which are associated with the current and predicted states, are maintained in a data structure. A predicted state manager receives certain user inputs and application instructions, and determines the effect of their execution based on the predicted state instead of the current state (using the predicted state values, for example). The effects of a particular instruction or user input may then be executed at a predetermined time, such as after the next playable media sample is played to the user.

The predicted state manager may function at various places within the presentation system. In one scenario, the predicted state manager functions as a virtual media processing pipeline that supplements, or serves as a substitute for, the performance of a physical media processing pipeline. Application programming interfaces ("APIs") may also be provided, so that application authors can access functions associated with the predicted state manager in a transparent manner.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
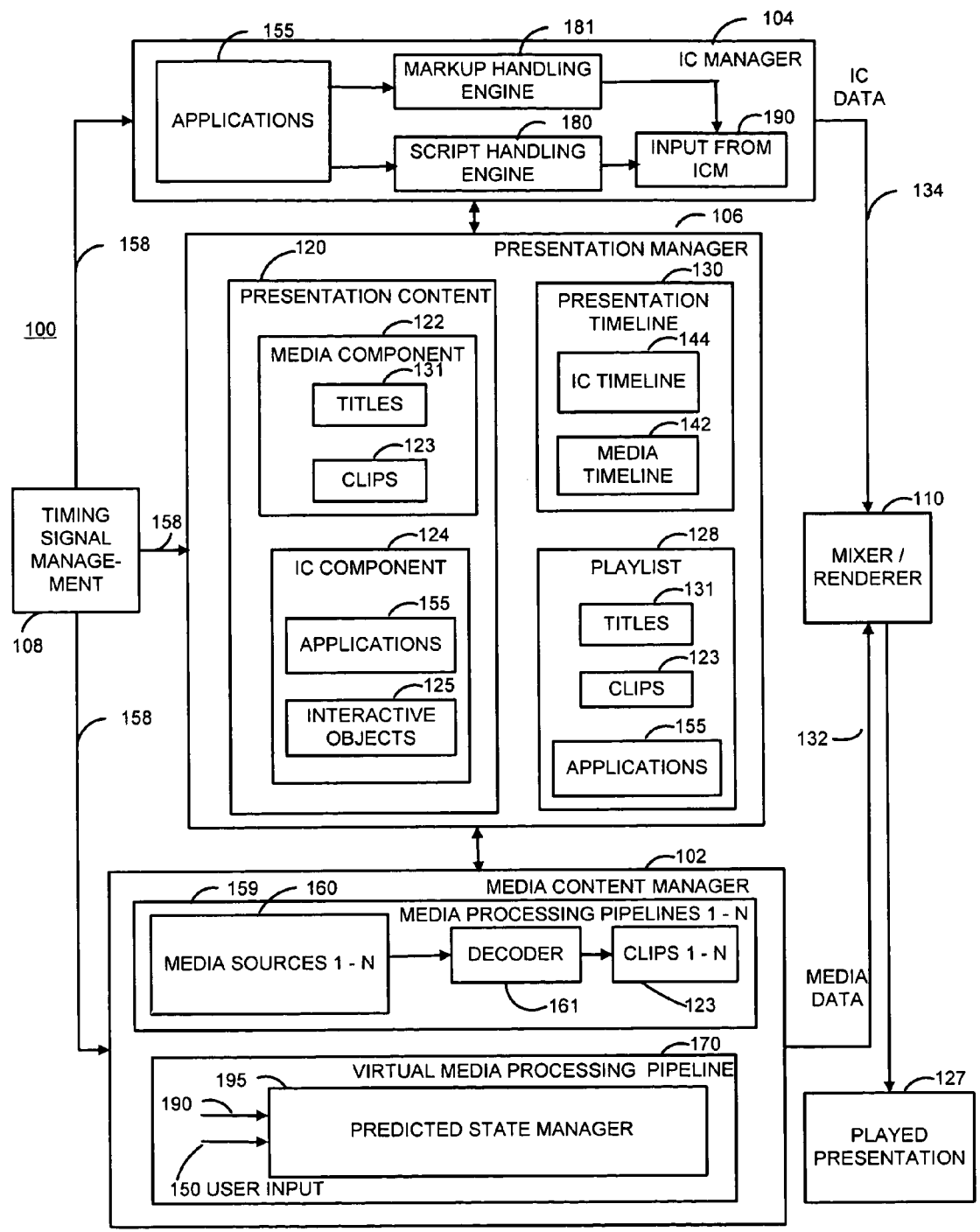
FIG. 1 is a simplified functional block diagram of an interactive multimedia presentation system.

When a presentation system plays an interactive multimedia presentation that includes a media content component and an interactive content component, it is desirable to time the effects of execution of certain user inputs or application instructions in a manner that ensures the predictable and relatively glitch-free play of the media content component and perceived synchronization between the media content component and the interactive content component.

Certain user inputs (such as play speed inputs and selection of interactive objects) and application instructions (such as script instructions) affect what will be next played to a user. Often, such user inputs and application instructions arise when portions of the media content component and/or interactive content component are being pre-rendered, so it is important to determine whether their effects should be executed and shown to the user before, after, or instead of, the effects of the pre-rendered material.

Timing techniques described herein use the notions of current and predicted states. A current state is associated with an aspect of the presentation system at the time a current media sample is being played to a user (for example, with the state of the current media sample or with a state of a media source from which the current media sample is derived). A predicted state is associated with an aspect of the presentation system at a future time (for example, at the time one or more future media samples are playable to a user, such as the time the next media sample, which may or may not be the next consecutive media sample, is playable to the user). An instruction or user input that is to be executed based on the current state is identified, and instead of executing the instruction or user input based on the current state, the effect of the instruction or user input is determined based on the predicted state. The effect may then be executed at a predetermined time, such as before or after the next playable media sample is played to the user.

Various, virtually unlimited, states may be defined. For exemplary purposes, media retrieval states and media presentation states (and combinations thereof) are discussed. Examples of media retrieval states include but are not limited to one or more of the following: a normal play retrieval state, a pause retrieval state, a slow-forward retrieval state, a fast-forward retrieval state, a slow-reverse retrieval state a fast-reverse retrieval state, a closed state, a ready state, and a pre-rolling state. Examples of media presentation states include but are not limited to one or more of the following: a media capture state, a media layout state, an audio play state, and a user selection state. One or more state values (referred to as "media state values" for exemplary purposes) associated with both current and predicted states are maintained in a data structure.

The data structure is maintained and/or accessed by functionality (referred to herein as a "predicted state manager") within the presentation system that receives certain user inputs and application instructions and determines the effect of their execution based on predicted state values instead of current state values. In one implementation, the predicted state manager is software that implements various aspects of one or more application programming interfaces ("APIs") usable by application authors. The predicted state manager may function at various places within the presentation system. In one scenario, the predicted state manager acts as a virtual media processing pipeline that may supplement, or serve as a substitute for, the performance of a physical media processing pipeline.

Turning to the drawings, where like numerals designate like components, FIG. 1 is a simplified functional block diagram of an interactive multimedia presentation system ("Presentation System") 100. Presentation System 100 includes a media content manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a media content component ("media component") 122 and an interactive content component ("IC component") 124. Media component 122 and IC component 124 are generally, but need not be, handled as separate data streams, by media content manager 102 and IC manager 104, respectively.

Presentation System 100 also facilitates presentation of Presentation Content 120 to a user (not shown) as played presentation 127. Played presentation 127 represents the visible and/or audible information associated with Presentation Content 120 that is produced by mixer/renderer 110 and receivable by the user via devices such as displays or speakers (not shown). For discussion purposes, it is assumed that Presentation Content 120 and played presentation 127 represent high-definition DVD movie content, in any format. It will be appreciated, however, that Presentation Content 120 and Played Presentation 127 may be configured for presenting any type of presentation of media content now known or later developed.

Media component 122 represents the traditional video, audio or data components of Presentation Content 120. For example, a movie generally has one or more versions (a version for mature audiences, and a version for younger audiences, for example); one or more titles 131 with one or more chapters (not shown) associated with each title (titles are discussed further below, in connection with presentation manager 106); one or more audio tracks (for example, the movie may be played in one or more languages, with or without subtitles); and extra features such as director's commentary, additional footage, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions. It will also be appreciated that although media component 122 is referred to as a movie, media component 122 may in fact be video, audio, data, or any combination thereof.

Sets of media samples (for example, sets of video, audio, or data samples) that form media component 122 are referred to as clips 123 (clips 123 are shown within media component 122, media content manager 102, and playlist 128). Referring to media content manager 102, information associated with clips 123 is handled by one or more media processing pipelines 159 (one media processing pipeline, labeled 1-N, is shown to indicate that any number of media processing pipelines are possible). Within a particular media processing pipeline 159, information associated with clips 123 is received from a media source 160 and demultiplexed, decoded, and/or decrypted at a decoder block 161.

A particular media source 160 is any device, location, or data from which video, audio, or data is derived or obtained. Examples of media sources include, but are not limited to, networks, hard drives, optical media, alternate physical disks, and data structures referencing storage locations of specific video, audio, or data. In general, any computer-readable medium may serve as a media source (computer-readable media are discussed further below, in connection with FIG. 8).

Decoder blocks 161 represent any devices, techniques or steps used to retrieve renderable video, audio, or data content from information received from a media source 160. Decoder blocks 161 may include codecs, demultiplexers, or decrypters, for example. Decoder blocks 161 and components thereof may be implemented using hardware, software, firmware, or any combination thereof. Although a one-to-one relationship between decoders and media sources is shown, it will be appreciated that one decoder may serve multiple media sources, and vice-versa. For example, some commercially available DVD players include only one decoder.

In addition to physical media processing pipeline(s) 159, media content manager 102 includes one or more virtual media processing pipelines 170 (one shown). Virtual media processing pipeline 170 communicates with media processing pipeline(s) 159. In one implementation, virtual media processing pipeline 170 includes a predicted state manager 195, which may include implementations of application programming interfaces ("APIs") accessed via instructions written by authors of applications 155 (discussed further below) that are arranged for execution by IC manager 104. All as discussed further below in connection with FIGS. 5-7, predicted state manager 195 receives certain user inputs 150 and input 190, and is used to determine timing for execution of the effects of such user inputs 150 and input 190 on played presentation 127.

Media data 132 is data associated with media component 122 that has been prepared for rendering by media content manager 102 and transmitted to mixer/renderer 110. Samples (for example, frames) of media data 134 generally include, for each active clip 123, a rendering of a portion of the clip. The exact portion or amount of the clip rendered in a particular set of media data may be based on several factors, such as the characteristics of the video, audio, or data content of the clip or one or more parameters associated with the media source from which the media data is derived (for example, codec parameters or settings and encryption parameters or settings). Media content manager 102 has a dynamic media processing load based on the identity and scheduling of the various clips comprising media component 122 and/or IC component 124 (discussed below).

Referring again to Presentation Content 120, IC component 124 includes interactive objects 125, which are user-selectable visible or audible objects, optionally presentable concurrently with media component 122, along with any instructions (shown as applications 155 and discussed further below) for presenting the visible or audible objects. Interactive objects 125 may be static or animated. Examples of interactive objects include, among other things, video samples or clips, audio samples or clips, images, graphics, text, and combinations thereof.

Interactive objects 125 originate from one or more sources (not shown). A source is any device, location, or data from which interactive objects are derived or obtained. Examples of sources for interactive objects 125 include, but are not limited to, networks, hard drives, optical media, alternate physical disks, and data structures referencing storage locations of specific interactive objects. Examples of formats of interactive objects 125 include, but are not limited to, portable network graphics ("PNG"), joint photographic experts group ("JPEG"), moving picture experts group ("MPEG"), multiple-image network graphics ("MNG"), audio video interleave ("AVI"), extensible markup language ("XML"), hypertext markup language ("HTML"), extensible HTML ("XHTML"), extensible stylesheet language ("XSL"), and WAV.

Applications 155 provide the mechanism by which Presentation System 100 presents interactive objects 125 to a user. Applications 155 represent any signal processing method or stored instruction(s) that electronically control predetermined operations on data. It is assumed for discussion purposes that IC component 124 includes three applications 155, which are discussed further below in connection with FIGS. 2 and 3. Applications 155, either alone or in response to user events, may determine when media data associated with clips 123 or interactive objects 125 are presented to a user.

IC manager 104 includes a script handling engine 180 and a markup handling engine 181. Script handling engine 180 receives, interprets, and arranges for execution of script commands associated with application 155 (script 308 is shown and discussed in connection with FIG. 3). Markup handling engine 181 receives, interprets, and arranges for execution of markup associated with application 155 (markup elements 303 are shown and discussed in connection with FIG. 3). During execution of a particular application 155, IC manager 104 maintains the context for the state of the markup elements and/or associated interactive objects affected thereby, and a context for the script's variables, functions, and other states. As execution of application 155 progresses and user input is received, the properties of any affected elements/media objects are recorded and may be used to trigger behavior within played presentation 127. Certain instructions of application 155, labeled as "input from ICM" 190, may facilitate communication or interoperability with other functionality or components within Presentation System 100. As shown, input 190 is received by virtual processing pipeline 170/predicted state manager 195.

Interactive content data ("IC data") 134 is data associated with IC component 124 that has been prepared for rendering by IC manager 104 and transmitted to mixer/renderer 110. Each application may have an associated queue (not shown), which when in use holds one or more work items (not shown) associated with rendering the application. It is possible, however, for an application to have no active work items.

Presentation manager 106, which is configured for communication with media content manager 104, IC manager 102, mixer/renderer 110, and timing signal management block 108, facilitates handling of Presentation Content 120 and presentation of played presentation 127 to the user. Presentation manager 106 has access to a playlist 128. Playlist 128 includes, among other things, a time-ordered sequence of clips 123 and applications 155 (including interactive objects 125) that are presentable to a user. The clips 123 and applications 155/interactive objects 125 may be arranged to form one or more titles 131. For exemplary purposes, one title 131 is discussed herein. Playlist 128 may be implemented using an extensible markup language ("XML") document, or another data structure.

Presentation manager 106 uses playlist 128 to ascertain a presentation timeline 130 for title 131. Conceptually, presentation timeline 130 indicates the times within title 131 when specific clips 123 and applications 155 are presentable to a user. A sample presentation timeline 130, which illustrates exemplary relationships between presentations of clips 123 and applications 155 is shown and discussed in connection with FIG. 2. In certain circumstances, it is also useful to use playlist 128 and/or presentation timeline 130 to ascertain a media content timeline ("media timeline") 142 (an exemplary media timeline 142 is discussed further below, in connection with FIG. 6A) and an interactive content timeline ("IC timeline") 144 (an exemplary IC timeline 144 is discussed further below, in connection with FIG. 6B).

In operation, presentation manager 106 provides information, including but not limited to information about presentation timeline 130, media timeline 142, and/or IC timeline 144 to media content manager 102 and IC manager 104. Based on input from presentation manager 206, media content manager 102 prepares media data 132 for rendering, and IC manager 104 prepares IC data 134 for rendering. In one implementation, presentation manager 106 can control media processing pipelines 159 and virtual media processing pipeline 170.

Timing signal management block 108 produces various timing signals 158, which are used to control the timing for preparation and production of media data 132 and IC data 134 by media content manager 102 and IC manager 104, respectively. In particular, timing signals 158 are used to achieve approximate synchronization of media data 132 and IC data 134 (for example, timing/synchronization on a per-frame basis or on another time basis). Details of timing signal management block 108 and timing signals 158 are discussed further below, in connection with FIG. 4.

Mixer/renderer renders media data 132 in a video plane (not shown), and renders IC data 134 in a graphics plane (not shown). The graphics plane is generally, but not necessarily, overlayed onto the video plane to produce played presentation 127 for the user.

Figure 2:
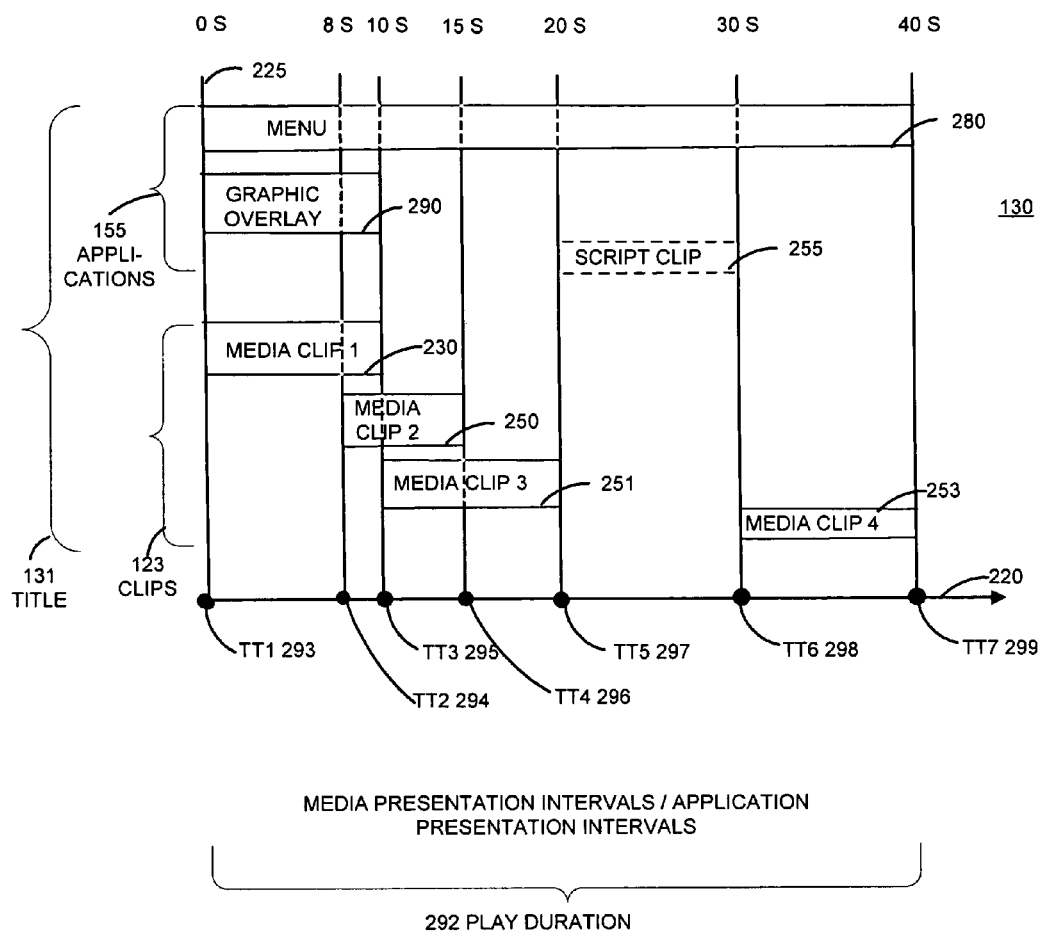
FIG. 2 is a graphical illustration of an exemplary presentation timeline, which is ascertainable from a playlist.

With continuing reference to FIG. 1, FIG. 2 is a graphical illustration of a sample presentation timeline 130 for title 131 within playlist 128. Time is shown on horizontal axis 220. Information presentable within title 131, specifically about media component 122 (clips 123 are illustrated) and IC component 124 (applications 155, which present interactive objects 125, are illustrated)—is shown on vertical axis 225.

Regarding clips 123 associated with media component 122, four clips 123 are shown: a first media clip ("media clip 1") 230, a second media clip ("media clip 2") 250, a third media clip ("media clip 3") 251, and a fourth media clip ("media clip 4") 253. Script clip 255 is a media clip, such as an animated thumbnail, which is not generally included in the playlist, but which may be optionally invoked (automatically or by a user) via an application at variable times (such as when no media content is scheduled for play, or when media content play has been paused) within played presentation 127.

Regarding IC component 124, one application is responsible for presenting certain interactive objects that provide user-selectable items (for example, buttons with associated text or graphics) of menu 280. Another application is responsible for presenting one or more interactive objects that provide graphic overlay 290. As shown, menu 280 is displayed concurrently with media clips 1 through 4, and graphic overlay 290 is displayable concurrently with media clip 1 230 and a portion of media clip 2. A third application is responsible for presenting script clip 255 when there is no media content scheduled for presentation (as shown, script clip 255 is playable between 20 seconds and 30 seconds).

The particular amount of time along horizontal axis 220 in which title 131 is presentable to the user is referred to as play duration 292 of title 131. Specific times within play duration 292 are referred to as title times. Seven title times ("TTs") are shown on presentation timeline 130—TT1 293, TT2 294, TT3 295, TT4 296, TT5 297, TT6 298, and TT7 299. Because a title may be played once or may be played more than once (in a looping fashion, for example) play duration 292 is determined based on one iteration of title 131. Play duration 292 may be determined with respect to any desired reference, including but not limited to a predetermined play speed (for example, normal, or 1×, play speed), a predetermined frame rate, or a predetermined timing signal status. Play speeds, frame rates, and timing signals are discussed further below, in connection with FIG. 4.

It will be appreciated that implementation-specific factors such as display techniques, and specific rules regarding play sequences and timing relationships among clips and interactive objects for each title may impact upon exact values of a title's play duration and title times therein. The terms play duration and title times are intended to encompass all such implementation-specific details.

Although title times at/within which content associated with IC component 124 is presentable are generally predetermined, it will be appreciated that actions taken when the user interacts with such content may only be determined based on user input while Played Presentation 127 is playing. For example, the user may select, activate, or deactivate certain applications, interactive objects, and/or additional content associated therewith during play of Played Presentation 127.

Media presentation intervals are defined by beginning and ending times of play duration 292 between which particular content associated with particular clips 123 is playable. That is, presentation intervals are generally based on specific times within play duration 292. Application presentation intervals (discussed further below, in connection with FIG. 3) may be similarly defined.

Figure 3:
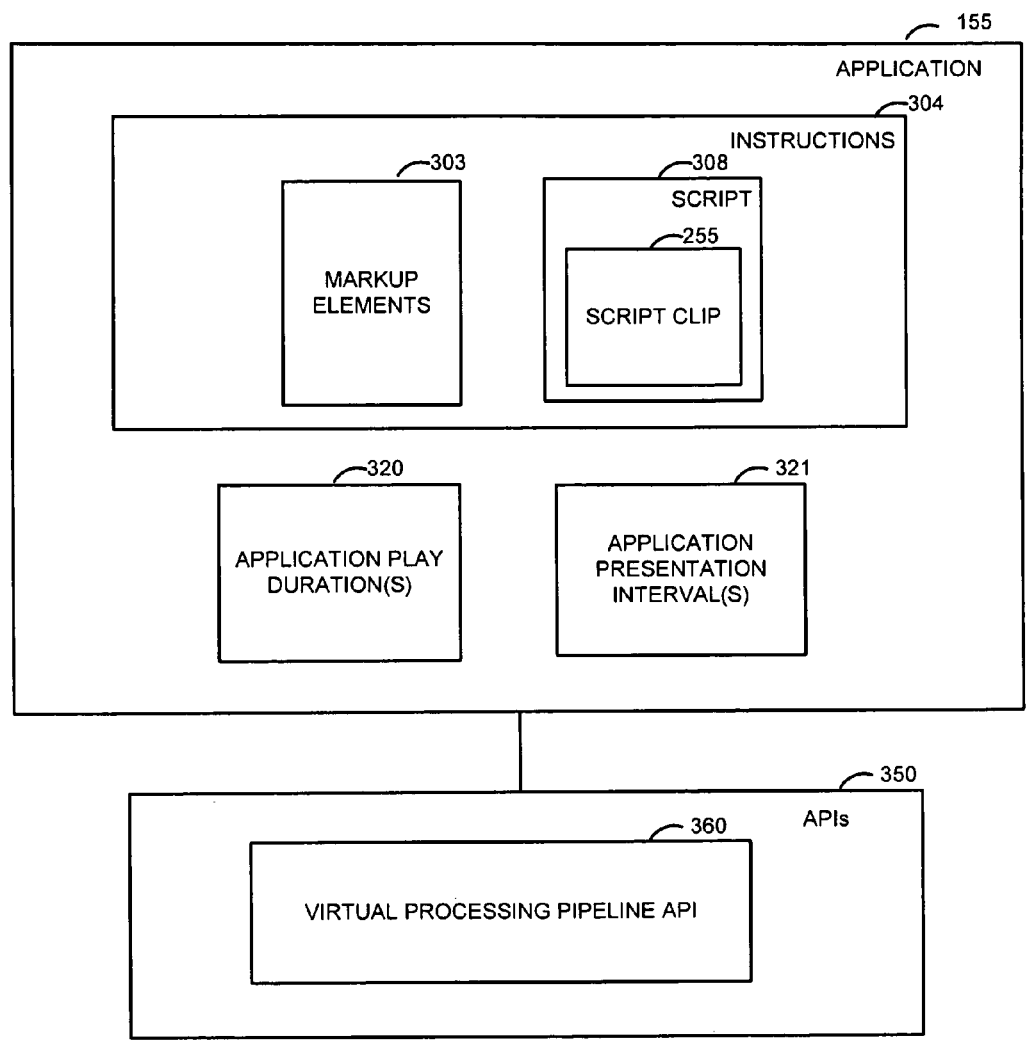
FIG. 3 is a simplified functional block diagram of an application associated with the interactive multimedia presentation shown in FIG. 1.

With continuing reference to FIGS. 1 and 2, FIG. 3 is a functional block diagram of a single application 155. Application 155 is generally representative of applications responsible for presenting interactive objects associated with menu 280, graphic overlay 290, and script clip 255 (shown in FIG. 2). Application 155 includes instructions 304 (discussed further below). Application 155 has associated therewith an application play duration 320 and one or more application presentation intervals 321.

An application play duration 320 is a particular amount of time, with reference to an amount (a part or all) of play duration 292 within which interactive objects 125 associated with application 155 are presentable to and/or selectable by a recipient of played presentation 127. The intervals defined by beginning and ending title times obtained when an application play duration 320 associated with a particular application is conceptualized on presentation timeline are referred to as application presentation intervals 321.

In some cases, application 155 may have more than one page (pages are not shown). A page is a logical grouping of one or more interactive objects that are contemporaneously presentable within a particular application play duration 320 and/or application presentation interval 321. The number of applications and pages associated with a given title, and the interactive objects associated with each application or page, are generally logical distinctions that are matters of design choice.

Instructions 304, when executed, perform tasks (among other tasks) related to rendering of interactive objects 125 associated with application 155 based on user input. User inputs may affect presentation of IC component 124 or media component 122. Examples of user inputs include, but are not limited to, user inputs that change the state of the media source (for example, play speed inputs), and user interaction with interactive objects within played presentation 127, such as selection of a button within menu 280, selection of the circle associated with graphical overlay 290, or invocation of script clip 255. Such interactions may occur using any type of user input device now known or later developed, including a keyboard, a remote control, a mouse, a stylus, or a voice command. It will be appreciated that application 155 may respond to events other than user events.

Generally, instructions 304 are computer-executable instructions or commands encoded in computer-readable media (discussed further below, in connection with FIGS. 8 and 9). In the examples set forth herein, instructions 304 are implemented using either markup elements 303 or script 308. Although either script or markup elements may be used alone, in general, the combination of script and markup elements enables the creation of a comprehensive set of interactive capabilities for a high-definition DVD movie.

Script 308 includes instructions 304 written in a non-declarative programming language, such as an imperative programming language. An imperative programming language describes computation in terms of a sequence of commands to be performed by a processor. Examples of when script is used include responding to user inputs, handling aspects of the presentation of interactive objects 125, system events, state management, and resource management (for example, accessing cached or persistently stored resources). Script 308 can affect what is next presented to a user via played presentation 127, and it may be desirable to control timing for execution of certain script commands, especially in an environment where multiple applications 155 issue commands that affect or are conditioned upon what is being presented, or scheduled for presentation to, a user.

Markup elements 303 represent instructions 304 written in a declarative programming language, such as Extensible Markup Language ("XML"). An XML schema is a definition of the syntax(es) of a class of XML documents. Some XML schemas are defined by the World Wide Web Consortium ("W3C"). Other XML schemas have been promulgated by the DVD Forum for use with XML documents in compliance with the DVD Specifications for High Definition Video, and for other uses. It will be appreciated that other schemas for high-definition DVD movies, as well as schemas for other interactive multimedia presentations, are possible.

Figure 7:
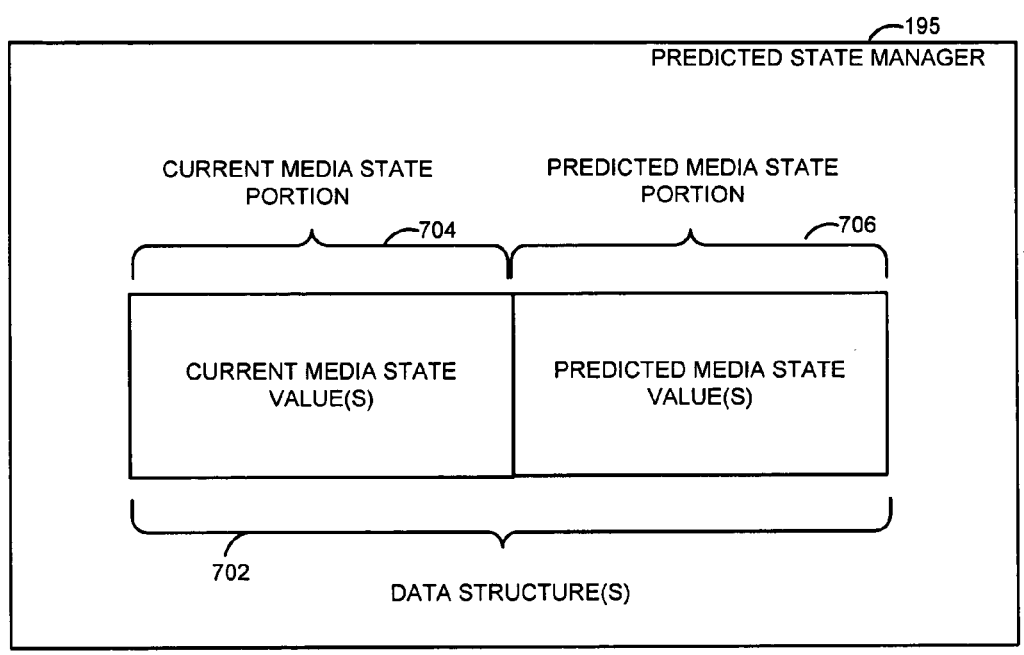
FIG. 7 is a simplified functional block diagram of the predicted state manager shown in FIG. 1.

With continuing reference to FIG. 3, application 155 may also use one or more application programming interfaces ("APIs") 350, such as virtual processing pipeline API 360, to access or execute the functionality of predicted state manager 195 (discussed further in connection with FIG. 7). In general, script authors use APIs 150 to access resources within and external to a particular application. For example, resources may be accessed using universal resource identifiers or other types of predetermined identifiers. Examples of resources within an application include but are not limited to interactive objects and markup associated with a particular application. Examples of resources external to a particular application include but are not limited to other applications, network locations, media content manager 102 and components thereof (such as virtual processing pipeline 170), presentation manager 106 and components thereof, IC manager 104 and components thereof, mixer/renderer 110 and components thereof, and timing signal management block 108 and components thereof. In the context of specifications for high definition video published by the DVD Forum, a class library of objects and methods accessible via APIs is set forth in Annex Z, which is incorporated by reference herein for all purposes.

With continuing reference to FIGS. 1-3, FIG. 4 is a simplified functional block diagram illustrating various components of timing signal management block 108 and timing signals 158 in more detail.

Timing signal management block 108 is responsible for the handling of clocks and/or timing signals that are used to determine specific times or time durations within Presentation System 100. As shown, a continuous timing signal 401 is produced at a predetermined rate by a clock source 402. Clock source 402 may be a clock associated with a processing system, such as a general-purpose computer or a special-purpose electronic device. Timing signal 401 produced by clock source 402 generally changes continually as a real-world clock would—within one second of real time, clock source 402 produces, at a predetermined rate, one second worth of timing signals 401.

Timing signal 401 is input to IC frame rate calculator 404, media frame rate calculator 406, time reference calculator 408, and time reference calculator 490. IC frame rate calculator 404 produces a timing signal 405 based on timing signal 401. Timing signal 405 is referred to as an "IC frame rate," which represents the rate at which frames of IC data 134 are produced by IC manager 104. One exemplary value of the IC frame rate is 30 frames per second. The frequency of IC frame rate 405 (referred to as the "presentation clock frequency") may dynamically change, however. It will also be appreciated that the processing load within various components of Presentation System 100 may change based on the presentation clock frequency. IC frame rate calculator 404 may reduce or increase the rate of timing signal 401 to produce timing signal 405.

Frames of IC data 134 generally include, for each valid application 155 and/or page thereof, a rendering of each interactive object 125 associated with the valid application and/or page in accordance with relevant user events. For exemplary purposes, a valid application is one that has an application presentation interval 321 within which the current title time of play duration 292 falls, based on presentation timeline 130. It will be appreciated that an application may have more than one application presentation interval. It will also be appreciated that no specific distinctions are made herein about an application's state based on user input or resource availability.

Media frame rate calculator 406 also produces a timing signal—timing signal 407—based on timing signal 401. Timing signal 407 is referred to as a "media frame rate," which represents the rate at which media samples are produced by media content manager 102. The media frame rate may be the same as, or different from, IC frame rate 405. One exemplary value of the media frame rate is 24 frames per second. The frequency of media frame rate 407 may dynamically change, however. Media frame rate calculator 406 may reduce or increase the rate of timing signal 401 to produce timing signal 407.

A clock source 470 produces timing signal 471, which governs the rate at which information associated with clips 123 is produced from media sources 161. Clock source 470 may be the same clock as clock 402, or based on the same clock as clock source 402. Alternatively, clocks 470 and 402 may be altogether different, and/or have different sources. Likewise, media frame rate 407 may be the same as, or based on the same value as, timing signal 471, or the timing signals may be different.

Clock source 470 adjusts the rate of timing signal 471 (which is referred to as the "media clock frequency") based on a media state indicator signal 481, which is produced by media state indicator block 480. The media clock frequency may also vary based on media source characteristics such as encoding or decoding rates. Thus, the media clock frequency may change from clip to clip.

Media state indicator block 480 may also represent, or be used to determine, one or more media states, which are retrieval or presentation states of video, audio, or data information from a particular media source 160 (shown in FIG. 1). Examples of media retrieval states include but are not limited to the normal play retrieval state, the paused retrieval state, the slow-forward retrieval state, the fast-forward retrieval state, the slow-reverse retrieval state, the fast-reverse retrieval state, the closed state, the ready state, and the pre-rolling state (all discussed further below). Examples of media presentation states include but are not limited to media capture states, media layout states, audio play states, or user selection states (all discussed further below) that indicate how or whether certain media data 132 or IC data 134 is presented within played presentation 127. Particular media retrieval states and media presentation states may have associated media state values (discussed further below, in connection with FIGS. 6A and 7). Media state values are one or more properties, attributes, or parameters associated with a particular media state.

More detailed descriptions of various exemplary media states follow. Retrieval states of video, audio, or data information from a particular media source may be defined based on various play speeds of played presentation 127. Certain user input 150 changes the play speed of played presentation 127, and thus the speed of retrieval of video, audio, or data information from a particular media source 160. For example, played presentation 127 may proceed in a forward direction at a normal speed, and may also proceed in both forward and reverse directions at speeds faster or slower than the normal speed. It will appreciated that normal speed is a relative term, and that normal speed may vary from presentation to presentation, and from clip to clip.

A normal play retrieval state is defined to occur when played presentation 127 proceeds in a forward direction at normal speed. A slow-forward retrieval state is defined to occur when played presentation 127 proceeds in a forward direction but slower than in real time. A fast-forward retrieval state is defined to occur when played presentation 127 proceeds in a forward direction but faster than in real time. A slow-reverse retrieval state is defined to occur when played presentation 127 proceeds in a reverse direction but slower than in real time. A fast-reverse retrieval state is defined to occur when played presentation 127 proceeds in a reverse direction but faster than in real time. A paused retrieval state is defined to occur when played presentation 127 is paused by a user.

During fast-reverse and fast-forward retrieval states, the playing of certain media content is often skipped. Other user input may cause the playing of certain content to be skipped, such as when the user jumps from one part of the movie to another (by making selections from interactive menus such as menu 280, for example).

Retrieval states associated with locating and/or beginning to play video, audio, or data information associated with a particular clip 123 from a particular media source 160 may also be defined. For example, a closed state is defined to occur before video, audio, or data information associated with a particular clip 123 has been read from a particular media source 160. A ready state is defined to occur when a first group of samples of video, audio, or data information from a particular media source 160 has been decoded and is ready to be rendered. A pre-rolling state is defined to occur between the closed state and the ready state, when steps are being taken to prepare the first group of samples of video, audio, or data information from a particular media source 160 for rendering. Other media samples may be concurrently presented using another media processing pipeline or media source, however, such as when play of the previous clip is ending, or when preparing for an unexpected transition without immediately stopping previous playback. Preparation steps include, but are not limited to, reading information from a particular media source 160, and demultiplexing, decoding and/or decrypting the information. It will be understood that the first group of samples of information from a particular media source is not necessarily the first group of samples occurring within a particular clip 123, and that how a first group of samples is defined may vary from presentation to presentation, based on factors such as encoding or encryption formats or protocols.

Media presentation states that indicate how or whether media data 132 or IC data 134 is presented within played presentation 127 may also be defined. For example, a media capture state may be defined that can occur in the paused retrieval state; a media layout state may be used to indicate whether the layout of media data 132 within played presentation 127 is changing; and an audio play state may be used to indicate whether certain audio effects are playing; and a resource indicator state may be used to identify an interactive object or another resource presentable within played presentation 127.

Figure 4:
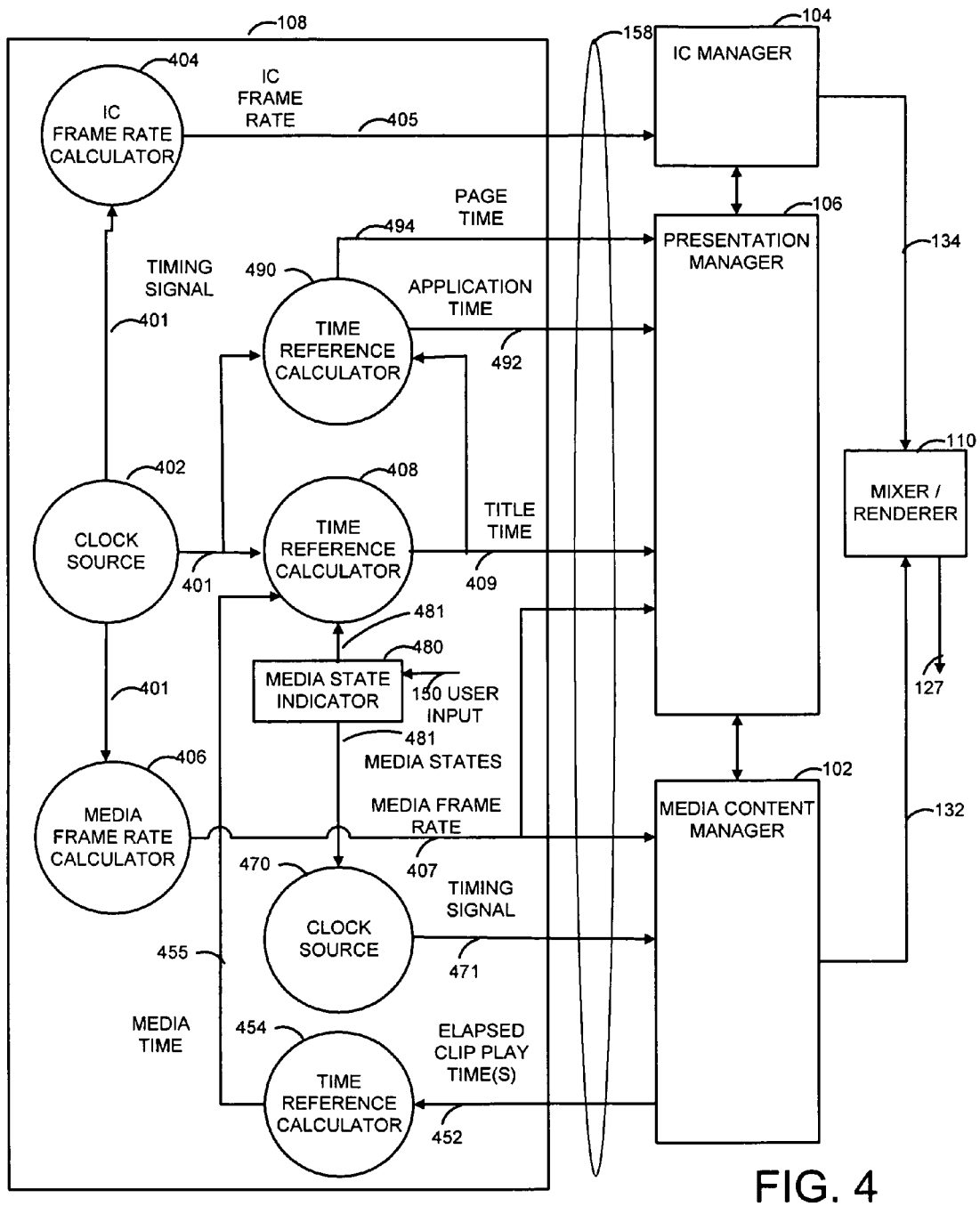
FIG. 4 is a simplified functional block diagram illustrating the timing signal management block of FIG. 1 in more detail.

Referring again to the elements of FIG. 4, elapsed clip play times 452 represent the amounts of time that have elapsed within particular presentation intervals associated with active clips 123. For purposes of discussion herein, an active clip is one that has a presentation interval (shown in FIG. 2) within which the current title time of play duration 292 falls, based on presentation timeline 130. Time reference calculator 454 receives time references 452 and produces a media time reference 455. Media time reference 455 represents the total amount of play duration 292 that has elapsed based on one or more time references 452. In general, when two or more clips are playing concurrently, only one time reference 452 is used to produce media time reference 455. The particular clip used to determine media time reference 455, and how media time reference 455 is determined based on multiple clips, is a matter of implementation preference.

Time reference calculator 408 receives timing signal 401, media time reference 455, and media state indicator signal 481, and produces a title time reference 409. Title time reference 409 represents the total amount of time that has elapsed within play duration 292 based on one or more of the inputs to time reference calculator 408.

Time reference calculator 490 receives timing signal 401 and title time reference 409, and produces application time reference(s) 492 and page time reference(s) 494. A single application time reference 492 represents an amount of elapsed time of a particular application play duration 320 (shown and discussed in connection with FIG. 3), with reference to continuous timing signal 401. Application time reference 492 is determined when title time reference 409 indicates that the current title time falls within application presentation interval 321 of the particular application. Application time reference 492 re-sets (for example, becomes inactive or starts over) at the completion of application presentation interval 321. Application time reference 492 may also re-set in other circumstances, such as in response to user events, or when trick play occurs.

Page time reference 494 represents an amount of elapsed time within a particular application play duration for a particular page of an application, with reference to continuous timing signal 401. Page time reference 494 for a particular page of an application is determined when title time reference 409 indicates that the current title time falls within an applicable page presentation interval (not shown). Page presentation intervals are sub-intervals of application presentation intervals 321 (shown in FIG. 3). Page time reference(s) 494 may re-set at the completion of the applicable page presentation interval(s) (not shown). Page time reference 494 may also re-set in other circumstances, such as in response to user events, or when trick play occurs. It will be appreciated that interactive object presentation intervals, which may be sub-intervals of application presentation intervals 321 and/or page presentation intervals, are also definable.

Table 1 illustrates exemplary occurrences during play of played presentation 127 by Presentation System 100, and the effects of such occurrences on application time reference 492, page time reference 494, title time reference 409, and media time reference 455.

TABLE 1

| Occurrence | Application Time 492 | Page Time 494 | Title Time 409 | Media Time 455 |
|---|---|---|---|---|
| Movie starts | Inactive unless/until application is valid | Inactive unless/until applicable page is valid | Starts (e.g., at zero) | Starts (e.g., at zero) |
| Next clip starts | Inactive unless/until application is valid | Inactive unless/until applicable page is valid | Determined based on previous title time and elapsed clip play time | Re-sets/re-starts |
| Next title starts | Inactive unless/until application is valid | Inactive unless/until applicable page is valid | Re-sets/re-starts | Re-sets/re-starts |
| Application becomes valid | Starts | Starts when applicable page is valid | Continues/no effect | Continues/no effect |
| Trick Play | Re-sets/re-starts if applicable application is valid at the title time jumped to; otherwise becomes inactive | Re-sets/re-starts if applicable page is valid at the title time jumped to; otherwise becomes inactive | Based on jumped-to location, advances or retreats to time corresponding to elapsed play duration on presentation timeline | Advances or retreats to time corresponding to elapsed clip play time(s) of active clip(s) at the jumped-to location within the title |
| Change play speed | Continues/no effect | Continues/no effect | Elapses N times faster | Elapses N times faster |
| Movie pauses | Continues/no effect | Continues/no effect | Pauses | Pauses |
| Movie resumes | Continues/no effect | Continues/no effect | Resumes | Resumes |

Having access to various timelines, clock sources, timing signals, and timing signal references enhances the ability of Presentation System 100 to achieve frame-level synchronization of IC data 124 and media data 132 within played presentation 127, and to prioritize the glitch-free presentation of the clips that comprise media component 122.

With continuing reference to FIGS. 1-4, FIG. 5 is a flowchart of one method for enhancing the ability of a presentation system, such as Presentation System 100, to present the media content and interactive content of a particular presentation, such as clips 123 and interactive objects 125 associated with applications 155 shown on presentation timeline 130 of FIG. 2, in a synchronous manner. More specifically, the method of FIG. 5 relates to timing for execution of certain user inputs and application instructions that affect the content of played presentation 127.

Figure 5:
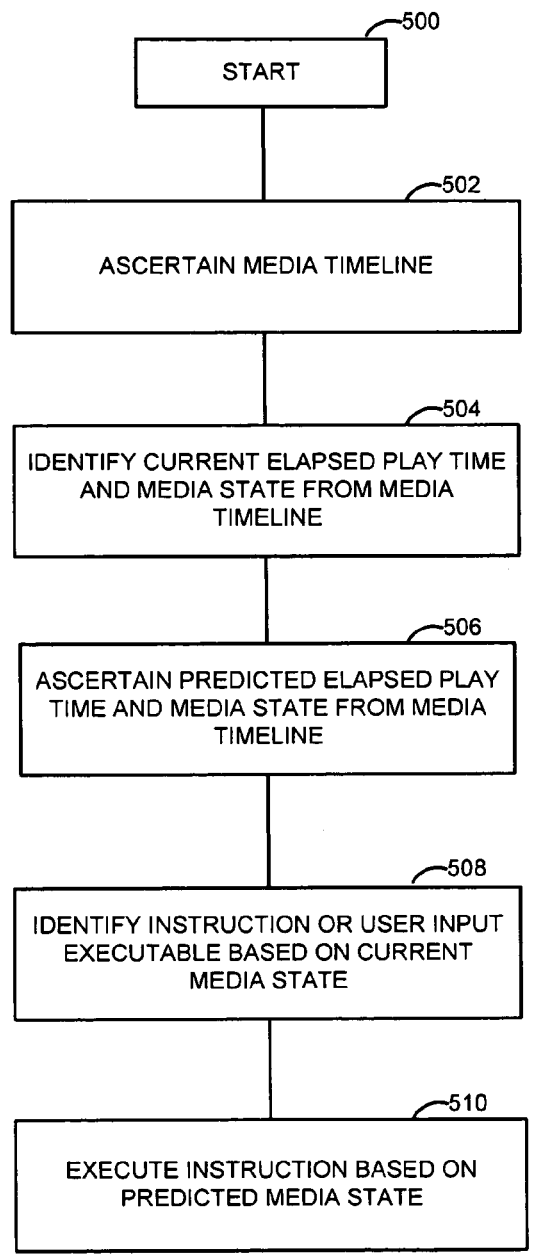
FIG. 5 is a flowchart of a method for playing an interactive multimedia presentation, using aspects of a presentation system such as the presentation system shown in FIG. 1.

The process(es) illustrated in FIG. 5 may be implemented in one or more general, multi-purpose, or single-purpose processors, such as processor 802 discussed below, in connection with FIG. 8. Unless specifically stated, the methods described herein are not constrained to a particular order or sequence. In addition, some of the described method or elements thereof can occur or be performed concurrently.

The method begins at block 500, and continues at block 502, where at least a portion of a media timeline, such as media timeline 142 (discussed in connection with FIG. 6A), is ascertained. At block 504, the media timeline is used to identify a current elapsed play time and a current state, such as a current media state, associated with a state of the presentation system at the current elapsed play time. The current elapsed play time represents a time within a play duration of the presentation when a current media sample from a current media source is being played to a user. The media timeline is also used to identify a predicted state, such as a media state, associated with a state of the presentation system at a future time (for exemplary purposes, the future time is identified as a predicted elapsed play time, but the future time may be any future time or interval thereof), at block 506. The predicted elapsed play time represents a time within the play duration when the next playable media sample from a next media source is playable to the user, but it will be understood that at the future time(s) one or more future media samples may be playable to the user. At block 508, an instruction or a user input is identified that is executable based on the current media state, and at block 510, the instruction is executed based on the predicted media state. Although it may be stated that a predicted elapsed play time is the time at which the next playable media sample is presentable, it will be appreciated that several frames (or seconds) may be buffered, so that the predicted elapsed play time may in fact be several frames (or seconds) in the future, and not necessarily the next consecutive media sample, or next frame.

Figures 6A, 6B:
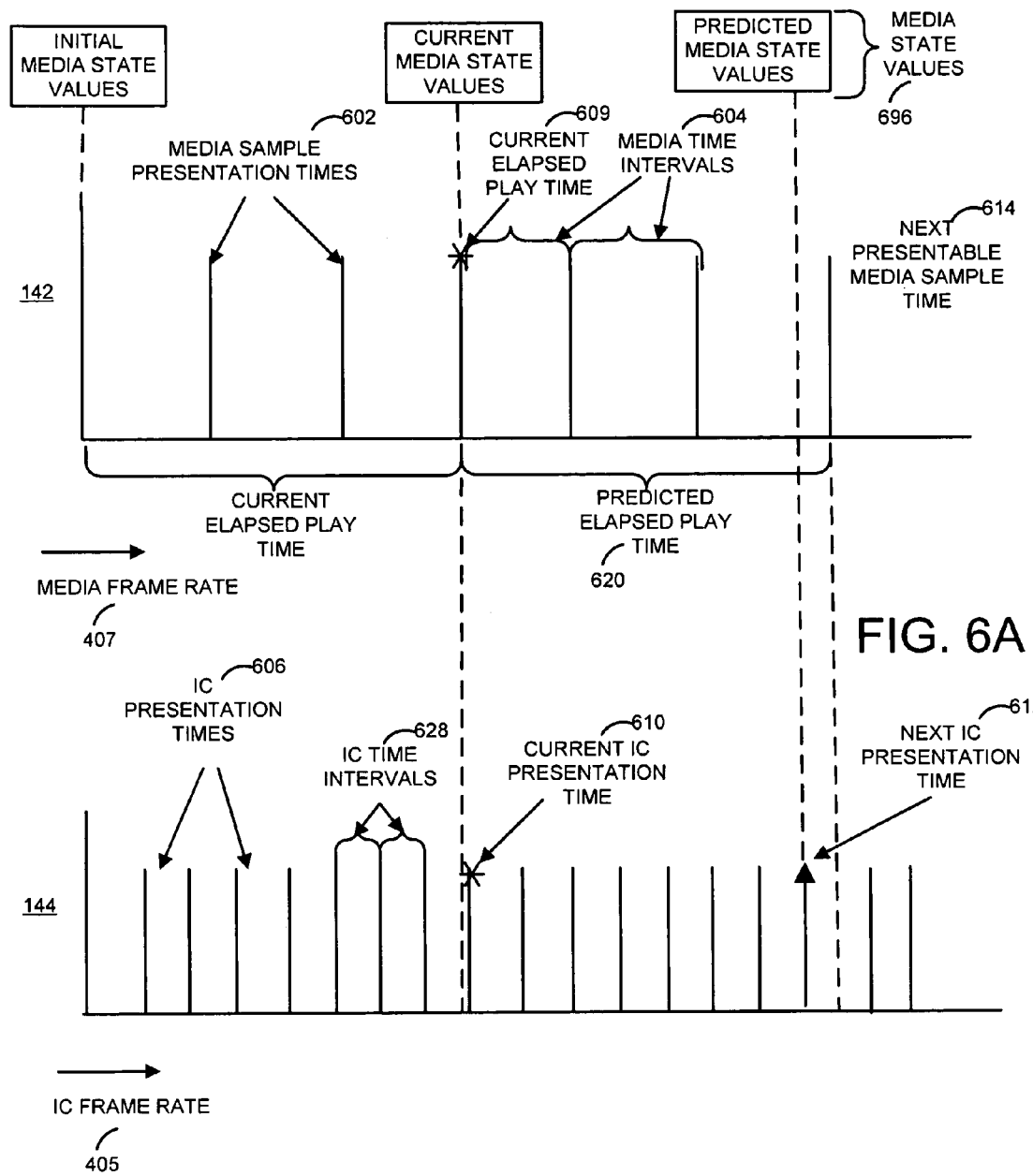
FIG. 6A is a schematic of an exemplary media timeline usable in connection with certain aspects of the presentation system shown in FIG. 1 and/or the method shown in the flowchart of FIG. 5.
FIG. 6B is a schematic of an exemplary interactive content timeline usable in connection with certain aspects of the presentation system shown in FIG. 1 and/or the method shown in the flowchart of FIG. 5.

FIG. 6A is a schematic of an exemplary media timeline 142 (with reference to media frame rate 407), which illustrates certain time segments and associated states/media state values 696 that arise during the play of media content 122.

Various media sample presentation times 602 are indicated on media timeline 142. Media sample presentation times 602 represent times within play duration 292 (shown in FIG. 2) at which one or more samples of clips 123 are presentable as media data 132. As shown, media sample presentation times 602 occur at a rate based on media frame rate 407, which also defines the duration of periodic media time intervals 604 between media sample presentation times 602. Note that it is not necessary for media frame rate 407 to be the same as the frame rate at which a particular clip 123 was encoded, although the media clock frequency may change based on the encoding frame rate for a particular clip.

A current elapsed play time 609 of play duration 292 is shown on media timeline 142. Current elapsed play time 609 may be the current value of title time 409, for example. A next presentable media sample presentation time 614 is also shown. Next presentable media sample presentation time 614 represents the media sample presentation time 602 associated with the next media sample(s) (after the current media sample associated with current elapsed play time 609/title time 409) that is presentable to a user. It will be appreciated that the next presentable media sample may be the next consecutive media sample based on playlist 128, or may be a media sample one or more media sample presentation times 602 away from the media sample associated with current elapsed play time 609.

One way to ascertain next presentable media sample presentation time 614 is to predict an amount of elapsed time 620 of play duration 292 (in addition to current elapsed play time 609/title time 409) that has passed based on the play speed and media frame rate 407. In one implementation, predicted elapsed play time 620 is calculated by estimating how many media sample presentation times 602 on media timeline 142 have passed since current elapsed play time 608/title time 409. For example, the predicted elapsed play time 620 may be calculated by adding a multiplier value to current elapsed play time 609. The multiplier value is obtained by multiplying a play speed factor (which may be a positive or a negative number, depending on the direction of the play speed change), by a frame rate factor. The play speed factor is obtained by dividing a value representing the play speed by media frame rate 407. The frame rate factor is obtained by dividing media frame rate 407 by IC frame rate 405. Then, predicted elapsed play time 620 is used to locate the particular media sample presentation time 602 that will be the next presentable media sample presentation time 614.

Often, at various play speeds, patterns can be observed between the predicted amount of elapsed time 620 (and media sample presentation times 602 corresponding thereto) and corresponding next presentable media sample presentation times 614. Recognizing such patterns may reduce the need to perform calculations at each media sample presentation time 602. The patterns can be represented in predetermined tables or other data structures, which can be used to look up next media sample presentation times 614 based on particular media sample presentation times 602. Using predetermined data structures or tables in this manner, rendering of certain frames and other adjustments may be skipped. In addition, multiple media timelines may be processed concurrently (in an instance where more than one clip is playing, for example).

Media state values 696 are defined to describe one or more aspects of states of the presentation system at various times within media timeline 142. For exemplary purposes, initial media state values, current media state values, and predicted media state values are defined at an initial play time (not shown), current elapsed play time 609, and predicted elapsed play time 620, respectively. In one implementation, media state values 696 describe aspects of a media state, such as a media retrieval state or a media presentation state. It will be appreciated, however, that states of the presentation system may be other than media-related states, and that any time base may be selected other than media sample presentation times 602.

Definitions for a wide variety of media states and media state values 696 are possible. In one scenario, at a particular time a media retrieval state may be defined to have different media state values 696 corresponding to paused, normal, slow-forward, fast-forward, slow-reverse, and fast-reverse. Alternatively, at a particular time multiple media retrieval states may be defined, each having media state values 696 assuming Boolean values. In another scenario, at a particular time multiple media presentation states may be defined, such as a media capture state, a media layout change state and an audio effect play state. The media presentation states may have Boolean values, indicating whether or not video is being recorded, a media layout is changing, or an audio effect is playing, respectively. In a further scenario, a media presentation state such as a resource indicator state may have a value corresponding to the URI or other identifier associated with an interactive object or another resource.

Certain media states and media state values 696 may be dependent on other media states or media state values 696. For example, the media capture state may only be set to true when a particular media retrieval state has a paused value (or alternatively when the paused retrieval state is true).

When media state values 696 describe aspects of a predicted media state, the predicted media state is generally a state that will exist at predicted elapsed play time 620. In some instances, however, an additional or different predicted media state may exist at one or more pre-rendering times (not shown) that precede predicted elapsed play time 620 by amounts based on variable time offset values. Pre-rendering involves retrieving and preparing for rendering certain interactive objects, or portions of clips from media sources, prior to the time at which such objects or clip portions are scheduled for presentation. Examples of media retrieval states associated with pre-rendering times include but are not limited to the closed state, the ready state, and the pre-rolling state.

FIG. 6B is a schematic of an exemplary IC timeline 144 (with reference to IC frame rate 405), which illustrates how the execution of certain application instructions or user input (especially when arising after current elapsed play time 609 but before predicted elapsed play time 620 occurs) may affect the content of played presentation 127.

IC presentation times 606 on IC timeline 144 represent times within play duration 292 at which application instructions are executable and/or interactive objects 125 are presentable or selectable. As shown, IC presentation times 606 occur at a rate based on IC frame rate 405, which also defines the duration of periodic interactive content time intervals 628 between IC presentation times 606. For discussion purposes, IC frame rate 405 is assumed to be 30 frames per second, although the presentation clock frequency may change dynamically.

A current interactive content presentation time ("current IC presentation time") 610 is ascertained based on current elapsed play time 609. Generally, IC presentation time 606 that corresponds to current elapsed play time 609 represents current IC presentation time 610. If there is no IC presentation time 606 on IC timeline 144 that corresponds exactly to current elapsed play time 609, another IC presentation time 606 (generally, the closest one) may be deemed to be current IC presentation time 610.

A next IC presentation time 612 is also ascertained with reference to IC timeline 144. In one implementation, next IC presentation time 612 is the IC presentation time 606 that corresponds to next presentable media sample presentation time 614 on media timeline 142. Next IC presentation time 612 may not be the next consecutive IC presentation time 606 with respect to current IC presentation time 610. One reason for these differences is because IC frame rate 405 may be different than media frame rate 407. Another reason is because user input may have affected the play speed (and/or direction) of the presentation.

In the case where next IC presentation time 612 occurs before next presentable media sample presentation time 614, or when application instructions or user input otherwise arise before next presentable media sample presentation time 614 is reached, it can be seen that the content of played presentation 127 may be affected. In particular, unduly immediate or delayed execution of such application instructions or user inputs may affect the current state of the presentation system, causing glitches in the play of media data 132, or loss of synchronization between media data 132 and IC data 134. It is desirable to identify certain application instructions and user inputs, and to determine whether their effects are best executed and shown to a user immediately, or whether they are better executed before, after, or instead of the effects of pre-rendered material.

FIG. 7 is a simplified functional block diagram of predicted state manager 195 (shown in FIG. 1), which receives certain types of user inputs 150 (such as selection of interactive objects 125 or play speed adjustments) and input 190 from IC manager 104 (such as certain script instructions associated with applications 155), and uses the contents of a data structure 702 to determine timing for the execution of their effects within played presentation 127.

Generally, data structure 702 includes one or more current state portions (one shown; referred to for exemplary purposes as a "current media state portion") 704 and one or more predicted state portions (one shown; referred to for exemplary purposes as a "predicted media state portion") 706. Current media state portion 704 is used to reference one or more states of Presentation System 100 (for example, media retrieval states or media presentation states) at current elapsed play time 609 (shown in FIG. 6A). Predicted media state portion 706 is used to store one or more aspects of one or more states of Presentation System 100 (for example, media retrieval states or media presentation states) at predicted elapsed play time 620 (also shown in FIG. 6A) and/or pre-rendering times associated therewith.

Current media state values are associated with current media state portion 704, and predicted media state values are associated with predicted media state portion 706. As play of media component 122 and IC component 124 progresses, predicted state manager 195 updates current media state values and predicted media state values.

In one implementation, predicted state manager 195 serves as a virtual media processing pipeline 170 (shown in FIG. 1), having output that affects or is substituted for the output of a physical media processing pipeline 159. For example, predicted state manager 195 may be an implementation of one or more APIs 350 (such as virtual processing pipeline API 360; both APIs 350 and API 360 are shown in FIG. 3), which are accessed via instructions written by authors of applications 155. Predicted state manager 195 may appear to application authors as a physical media processing pipeline 159. In other implementations, predicted state manager 195 may be located in other physical or logical components of Presentation System 100, such as IC manager 104, mixer/renderer 110, presentation manager 106, or aspects of timing signal management components 108.

In the case where predicted state manager 195 appears to application authors as a physical media processing pipeline, at each media sample presentation time (for example, each video frame presentation time) predicted state manager 195 initializes current media state values within current media state portion 704 with one or more values/states associated with the values/states of the current physical media processing pipeline. Then, certain APIs that manipulate the physical media processing pipeline are sent to the predicted state manager. Predicted state manager 195 updates predicted media state values to reflect the APIs, and queues up the effects of the APIs so that they may affect the content of played presentation 127 at desired times, as if executed by the physical media processing pipeline.

In one practical example, the current media retrieval state is assumed to be the normal play retrieval state, and it is also assumed (with reference to media timeline 142) that a media sample (such as a frame number) 25 is currently being played to a user. The next playable media sample is frame number 26, and as part of frame number 26, one application 155 associated with IC component 124 is to execute authored script, which will pause played presentation 127. Another application 155 will query the media retrieval state to determine whether played presentation is playing or paused.

At a pre-rendering time for frame number 26, predicted state manager 195 initializes one or more current media state values (for example, one or more values that indicate that the current media retrieval state is the normal play retrieval state) within current media state portion 704 of data structure 702. The script command used to pause played presentation 127 is authored script using an API that calls one or more functions implemented by predicted state manager 195. Predicted state manager 195 records (for example queues) that the physical media processing pipeline should execute a pause command, but the pause command may or may not be immediately sent to the physical media processing pipeline. The predicted state manager also initializes one or more predicted media state values (for example, one or more values that indicate that the predicted media retrieval state is the paused retrieval state) within predicted media state portion 706 of data structure 702.

When the other application queries the media retrieval state (by communicating with the predicted state manager via an API, for example), predicted state manager 195 returns the predicted media retrieval state (the paused retrieval state) instead of the current media retrieval state (the normal play retrieval state). This is consistent with what the application author would expect, and it is the same as what would have occurred if the pause command had been immediately executed by the physical media processing pipeline.

Once frame number 26 has been pre-rendered (for example, the ready state is reached), the predicted state manager and/or the physical media processing pipeline are notified. When the next presentable media sample presentation time 614 (shown in FIG. 6A) associated with frame number 26 arises, the physical media processing pipeline 159 (or another component of Presentation System 100) requests the recorded/queued commands from predicted state manager 195, in this case finding the pause command. The recorded/queued commands, in this case the pause command, may be executed before, after, or in place of the material of frame number 26.

It will be appreciated that the effects of various user inputs and application instructions can be determined with respect to a virtually unlimited number of states associated with Presentation System 100, and recorded/queued by predicted state manager 195 for timed execution (or for immediate execution). Some additional examples include, but are not limited to, whether or not certain sound effects are playing, and which interactive objects are presentable to a user with which media samples. Certain user inputs or application instructions may change state information within predicted state manager 195, while other user inputs or application instructions may rely on state information within predicted state manager 195 (such as methods that execute conditional processing based on state information).

Figure 8:
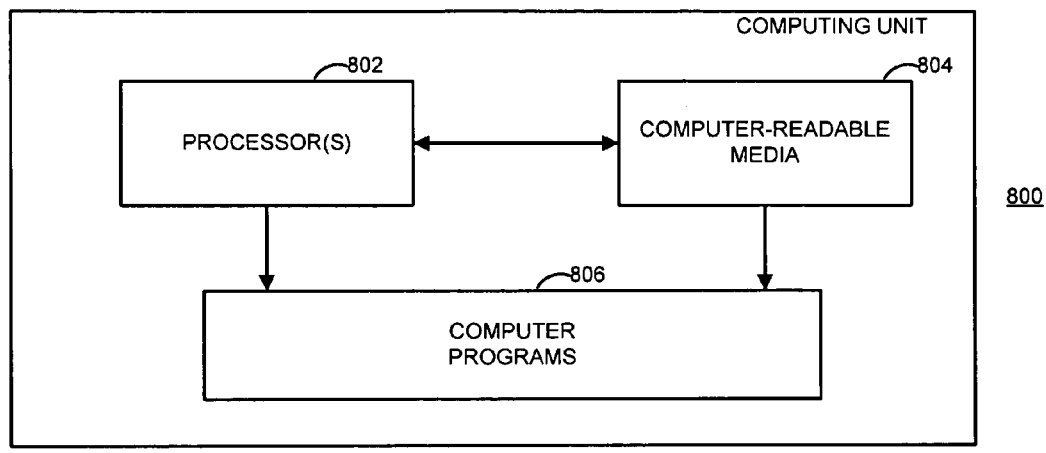
FIG. 8 is a simplified functional block diagram of a computing unit.

FIG. 8 is a block diagram of a general-purpose computing unit 800, illustrating certain functional components that may be used to implement, may be accessed by, or may be included in, various functional components of Presentation System 100. One or more components of computing unit 800 may be used to implement, be accessible by, or be included in, IC manager 104, presentation manager 106, and media content manager 102. For example, one or more components of FIG. 8 may be packaged together or separately to implement functions of Presentation System 100 (in whole or in part) in a variety of ways.

One or more processors 802 are responsive to computer-readable media 804 and to computer programs 806. Processor(s) 802, which may be physical or virtual processors, control functions of an electronic device by executing computer-executable instructions. Processor(s) 802 may execute instructions at the assembly, compiled, or machine-level to perform a particular process. Such instructions may be created using source code or any other known computer program design tool.

Computer-readable media 804 represent any number and combination of local or remote devices, in any form, now known or later developed, capable of recording or storing computer-readable data, such as the instructions executable by processor 802. In particular, computer-readable media 804 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer programs 806 represent any signal processing methods or stored instructions that electronically control predetermined operations on data. In general, computer programs 806 are computer-executable instructions implemented as software components according to well-known practices for component-based software development, and encoded in computer-readable media (such as computer-readable media 804). Computer programs may be combined or distributed in various ways.

Functions/components described in the context of Presentation System 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of Presentation System 100.

Figure 9:
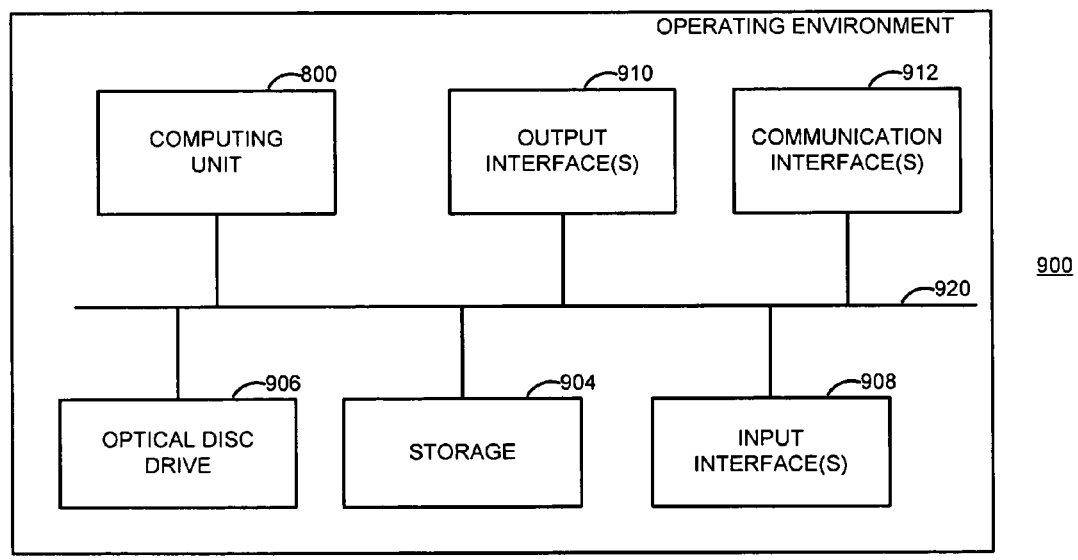
FIG. 9 is a simplified functional block diagram of an exemplary configuration of an operating environment (that includes the computing unit of FIG. 8), in which the interactive multimedia presentation system shown in FIG. 1 and/or the method shown in the flowchart of FIG. 5 may be implemented or used.

With continued reference to FIG. 8, FIG. 9 is a block diagram of an exemplary configuration of an operating environment 900 in which all or part of Presentation System 100 may be implemented or used. Operating environment 900 is generally indicative of a wide variety of general-purpose or special-purpose computing environments. Operating environment 900 is only one example of a suitable operating environment and is not intended to suggest any limitation as to the scope of use or functionality of the system(s) and methods described herein. For example, operating environment 900 may be a type of computer, such as a personal computer, a workstation, a server, a portable device, a laptop, a tablet, or any other type of electronic device, such as an optical media player or another type of media player, now known or later developed, or any aspect thereof. Operating environment 900 may also be a distributed computing network or a Web service, for example. A specific example of operating environment 900 is an environment, such as a DVD player or an operating system associated therewith, which facilitates playing high-definition DVD movies.

As shown, operating environment 900 includes or accesses components of computing unit 800, including processor 802, computer-readable media 804, and computer programs 806. Storage 904 includes additional or different computer-readable media associated specifically with operating environment 900, such as an optical disc, which is handled by optical disc drive 906. One or more internal buses 920, which are well-known and widely available elements, may be used to carry data, addresses, control signals and other information within, to, or from computing environment 900 or elements thereof.

Input interface(s) 908 provide input to computing environment 900. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 910 provide output from operating environment 900. Examples of output interface(s) 910 include displays, printers, speakers, drives (such as optical disc drive 906 and other disc drives), and the like.

External communication interface(s) 912 are available to enhance the ability of operating environment 900 to receive information from, or to transmit information to, another entity via a communication medium such as a channel signal, a data signal, or a computer-readable medium. External communication interface(s) 912 may be, or may include, elements such as cable modems, data terminal equipment, media players, data storage devices, personal digital assistants, or any other device or component/combination thereof, along with associated network support devices and/or software or interfaces.

Figure 10:
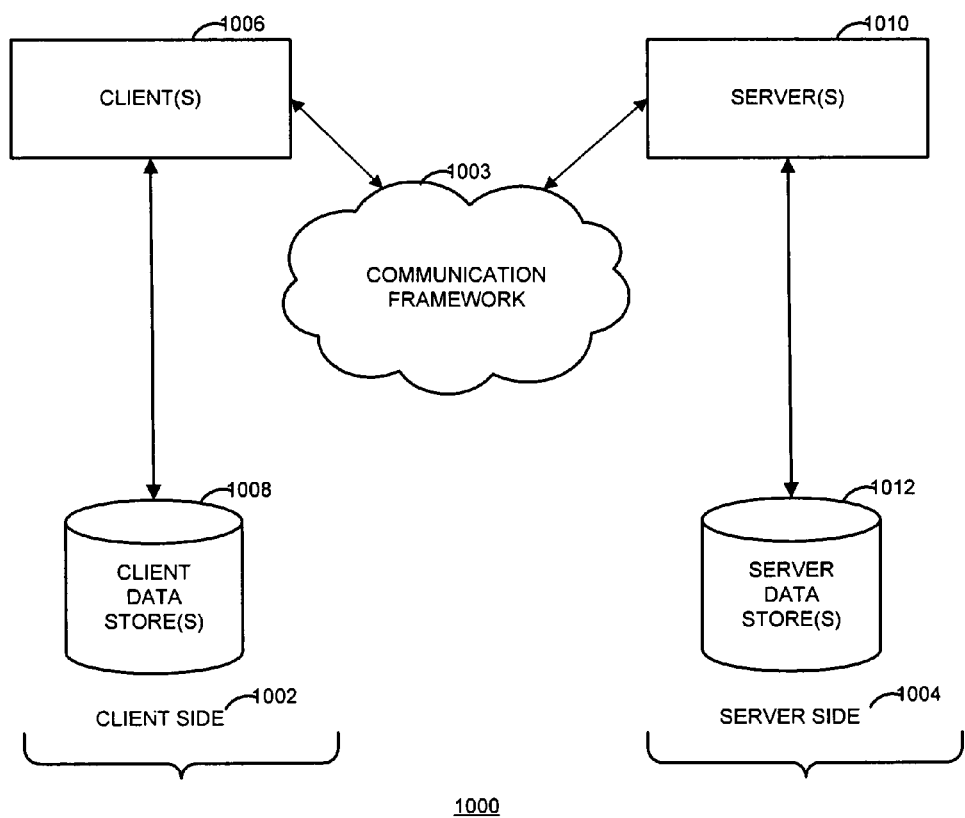
FIG. 10 is a simplified functional diagram of a client-server architecture in which the presentation system shown in FIG. 1 and/or the method shown in the flowchart of FIG. 5 may be implemented or used.

FIG. 10 is a simplified functional diagram of a client-server architecture 1000 in connection with which the Presentation System 100 or operating environment 900 may be used. One or more aspects of Presentation System 100 and/or operating environment 900 may be represented on a client-side 1002 of architecture 1000 or on a server-side 1004 of architecture 1000. As shown, communication framework 1003 (which may be any public or private network of any type, for example, wired or wireless) facilitates communication between client-side 1002 and server-side 1004.

On client-side 1002, one or more clients 1006, which may be implemented in hardware, software, firmware, or any combination thereof, are responsive to client data stores 1008. Client data stores 1008 may be computer-readable media 804, employed to store information local to clients 1006. On server-side 1004, one or more servers 1010 are responsive to server data stores 1012. Like client data stores 1008, server data stores 1012 may include one or more computer-readable media 804, employed to store information local to servers 1010.

Various aspects of a presentation system that is used to present interactive content to a user synchronously with media content have been described. It will be understood, however, that all of the described components of the presentation system need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium encoded with computer-executable instructions which, when executed by a processor, perform a method for playing an interactive multimedia presentation using a presentation system, the interactive multimedia presentation having a play duration, a media content component arranged into a plurality of media samples receivable from a media source, and having an interactive content component, an application having computer-executable instructions for playing the interactive content component, the method comprising:

ascertaining at least a portion of a media timeline having media sample presentation times representing times within the play duration at which at least one media sample is playable to a user;

with reference to the media timeline, identifying a current elapsed play time representing a time within the play duration when a current media sample from a current media source is playable to a user;

ascertaining a current state associated with a state of the presentation system at the current elapsed play time;

with reference to the media timeline, identifying a predicted elapsed play time within the play duration at which a next playable media sample from a next media source is playable to the user;

ascertaining a predicted state associated with a state of the presentation system at the predicted elapsed play time;

identifying an instruction or a user input that is scheduled for execution based on the current state, the instruction able to cause loss of frame-level synchronization between the media content component and the interactive content component; and prior to the predicted elapsed play time arising, arranging for execution of the instruction or the user input based on the predicted state instead of the current state, to maintain frame-level synchronization between the media content component and the interactive content component.

2. The computer-readable storage medium according to claim 1, wherein the next playable media sample is not the next consecutive media sample.

3. The computer-readable storage medium according to claim 1, further comprising:

identifying a user input occurring after the current elapsed play time, the predicted state based on the user input.

4. The computer-readable storage medium according to claim 3, wherein the user input is selected form the group consisting of: a play speed input; and a selection of an interactive object associated with the interactive content component.

5. The computer-readable storage medium according to claim 1, wherein the current state and the predicted state are selected from the group consisting of: the current media sample; the current media source; a next playable media sample; and a next media source.

6. The computer-readable storage medium according to claim 1, wherein the predicted state comprises a retrieval state associated with a future media source.

7. The computer-readable storage medium according to claim 1, wherein execution of the instruction modifies the current state or is conditioned upon the current state.

8. The computer-readable storage medium according to claim 1, wherein the step of arranging for execution of the instruction occurs after the current elapsed play time arises.

9. The computer-readable storage medium according to claim 8, wherein the current media sample is being rendered to a user, and wherein the next playable media sample is being prepared for rendering to the user.

10. The computer-readable storage medium according to claim 1, wherein the instruction is associated with an application programming interface ("API") used by an author of the application.

11. The computer-readable storage medium according to claim 10, wherein the step of arranging for execution of the instruction is performed by an implementation of the API.

12. The computer-readable storage medium according to claim 1, wherein the instruction comprises an imperative instruction.

13. An apparatus for playing an interactive multimedia presentation, the interactive multimedia presentation having a play duration, a media content component arranged into a plurality of media samples receivable from a media source, and having an interactive content component, an application having computer-executable instructions for playing the interactive content component, the apparatus comprising:

a computer-readable storage medium; and a processor responsive to the computer-readable storage medium and to a computer program stored in the computer-readable storage medium, the computer program, when loaded into the processor and executed, operable to ascertain at least a portion of a media timeline having media sample presentation times representing times within the play duration at which at least one media sample is playable to a user, with reference to the media timeline, identify a current elapsed play time representing a time within the play duration when a current media sample from a current media source is playable to a user, with reference to the media timeline, identify one or more future play times representing times within the play duration at which one or more future playable media samples from one or more future media sources are playable to a user, identify an application instruction scheduled for execution after the current elapsed play time arises but before the one or more future play times arise, execution of the instruction able to cause loss of frame-level synchronization between the media content component and the interactive content component and prior to the one or more future play times arising, query a data structure about a first state value associated with a current state, the data structure comprising a first data portion having information identifying the first state value, the first state value associated with the current state, the current state associated with the current media sample or the current media source, and a second data portion having information identifying a second state value, the second state value associated with a predicted state, the predicted state associated with one or more of the future media samples or the future media sources, the data structure returning the second state value in response to queries about the first state value;

based on the query, prior to the one or more future play times arising, execute the application instruction based on the second state value, to maintain frame-level synchronization between the media content component and the interactive content component.

* * * * *